(12) United States Patent
Schuller et al.

(10) Patent No.: US 9,587,948 B2
(45) Date of Patent: Mar. 7, 2017

(54) METHOD FOR DETERMINING THE ABSOLUTE POSITION OF A MOBILE UNIT, AND MOBILE UNIT

(71) Applicant: Audi AG, Ingolstadt (DE)

(72) Inventors: Florian Schuller, Ismaning (DE); Harald Altinger, Gerolfing (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/033,019

(22) PCT Filed: Feb. 11, 2015

(86) PCT No.: PCT/EP2015/000295
§ 371 (c)(1),
(2) Date: Apr. 28, 2016

(87) PCT Pub. No.: WO2015/120981
PCT Pub. Date: Aug. 20, 2015

(65) Prior Publication Data
US 2016/0265919 A1    Sep. 15, 2016

(30) Foreign Application Priority Data

Feb. 15, 2014   (DE) .................. 10 2014 002 150

(51) Int. Cl.
*G01C 21/30* (2006.01)
*G01C 21/16* (2006.01)
(Continued)

(52) U.S. Cl.
CPC ......... *G01C 21/165* (2013.01); *G01C 21/206* (2013.01); *G01C 21/30* (2013.01);
(Continued)

(58) Field of Classification Search
CPC .................. G06T 2207/30204; G06K 7/00
See application file for complete search history.

(56) References Cited

U.S. PATENT DOCUMENTS

2008/0137912 A1   6/2008  Kim et al.
2009/0228204 A1*  9/2009  Zavoli .................. G01C 21/30
                                              701/532
(Continued)

FOREIGN PATENT DOCUMENTS

DE       4138270 A1     5/1993
DE    10121260 A1    11/2002
(Continued)

OTHER PUBLICATIONS

International Search Report and Written Opinion of the International Searching Authority directed to related International Patent Application No. PCT/EP2015/000295, with attached English-language translation, mailed May 22, 2015; 11 pages.
(Continued)

*Primary Examiner* — Thomas G Black
*Assistant Examiner* — Ana Thomas
(74) *Attorney, Agent, or Firm* — Sterne, Kessler, Goldstein & Fox P.L.L.C.

(57) ABSTRACT

The present disclosure discloses a method for determining the absolute position of a mobile unit, which has at least one optical surroundings sensor that captures a detection area of the environs of the mobile unit, in a predefined navigation environment, wherein optical, distinguishable markers which can be detected by the surroundings sensor are used in the navigation environment, wherein, for position determination, at least one marker is detected and identified, by means of an image processing algorithm, in sensor data recorded by at least one of the at least one surroundings sensors, and a relative position between the mobile unit and the marker is determined taking account of the position of the marker in the sensor data, and an absolute position of the mobile unit is determined as a function of the relative position and the absolute position of the marker.

19 Claims, 4 Drawing Sheets

(51) Int. Cl.
*G01C 21/20* (2006.01)
*G01C 21/36* (2006.01)
*G05D 1/02* (2006.01)
*G06K 9/00* (2006.01)
*G06T 7/00* (2006.01)

(52) U.S. Cl.
CPC ....... *G01C 21/3602* (2013.01); *G05D 1/0234* (2013.01); *G05D 1/0246* (2013.01); *G05D 1/0274* (2013.01); *G06K 9/00476* (2013.01); *G06K 9/00791* (2013.01); *G06T 7/004* (2013.01); *G05D 2201/0213* (2013.01); *G06T 2207/30204* (2013.01); *G06T 2207/30252* (2013.01)

(56) References Cited

U.S. PATENT DOCUMENTS

| | | | |
|---|---|---|---|
| 2010/0061591 A1* | 3/2010 | Okada | G01C 7/04 382/103 |
| 2010/0103040 A1* | 4/2010 | Broadbent | G01S 19/48 342/357.28 |
| 2012/0176491 A1 | 7/2012 | Garin et al. | |
| 2012/0203453 A1 | 8/2012 | Lundquist et al. | |
| 2013/0026224 A1 | 1/2013 | Ganick et al. | |
| 2013/0101163 A1 | 4/2013 | Gupta et al. | |
| 2013/0179074 A1 | 7/2013 | Haverinen | |
| 2013/0211718 A1 | 8/2013 | Yoo et al. | |
| 2013/0212094 A1 | 8/2013 | Naguib et al. | |
| 2013/0281111 A1 | 10/2013 | Syrjarinne et al. | |

FOREIGN PATENT DOCUMENTS

| | | |
|---|---|---|
| DE | 102009045326 A1 | 4/2011 |
| DE | 102011119762 A1 | 6/2012 |
| DE | 102011112404 A1 | 3/2013 |
| WO | WO 2008/009966 A2 | 1/2008 |
| WO | WO 2009/098319 A2 | 8/2009 |

OTHER PUBLICATIONS

International Preliminary Report on Patentability directed to related International Patent Application No. PCT/EP2015/000295, with attached English-language translation, mailed Jan. 11, 2016; 7 pages.
English-language abstract of German Patent Publication No. 4138270 A1, published May 27, 1993; 2 pages.
English-language abstract of German Patent Publication No. 10121260 A1, published Nov. 21, 2002; 1 page.
English-language abstract of German Patent Publication No. 102009045326 A1, English-language published Apr. 7, 2011; 1 page.
English-language abstract of German Patent Publication No. 102011112404 A1, published Mar. 7, 2013; 1 page.
English-language abstract of German Patent Publication No. 102011119762 A1, published Jun. 6, 2012; 1 page.

* cited by examiner

METHOD FOR DETERMINING THE ABSOLUTE POSITION OF A MOBILE UNIT, AND MOBILE UNIT

TECHNICAL FIELD

The invention relates to a method for determining the absolute position of a mobile unit. The invention also relates to a mobile unit, particularly a motor vehicle.

BACKGROUND

The ability to navigate a mobile unit in a specific navigation environment is a frequently encountered technical problem. Typical examples include the navigation of transport units, robots or the like in warehouses and logistics centers, but also destination guidance of motor vehicles, for example in a parking lot or parking structure. This question becomes interesting, especially in the field of motor vehicles, if a fully automated vehicle system is provided which completely takes over vehicle guidance, thus allowing autonomous (fully automated) operation of the motor vehicle.

But even if a motor vehicle is at least partially manually operated, hints are often desired, for example in parking environments, for example for guidance to a free parking spot.

Where mobile devices are used as mobile units, such position sensing approaches are pursued in the field of "augmented reality" (AR). In this context, AR markers have been proposed for camera-based localization, said markers being optical conspicuity markings which have to comply with specific requirements such as shape, color, figure and the like. It has been demonstrated for these AR markers that relative position determination is possible down to the subpixel level. An example of such AR markers (augmented reality markers) is the "ARToolkit" by the Human Interface Technology Laboratory of the University of Washington.

Today's state-of-the-art methods of position determination are based on global navigation satellite systems (GNSS), such as GPS (Global Positioning System). However, such global navigation satellite systems can mostly be used outdoors only since reception inside buildings is difficult or impossible to achieve. Other positioning approaches, which can also be used inside buildings, are based on radio signals. Examples include so-called runtime methods and methods based on received signal strength. This however requires the rather complex installation of the suitable technical devices within the navigation environment, e.g. a parking structure.

Technologies based on optical position determination using markers are in principle much easier to implement—when using AR markers, for example, it is sufficient to install just these to at least be able to determine a relative position. Like with other markers, this is done using image processing algorithms which can derive a relative position that also includes a distance based on the way in which the marker is represented in the sensor data, e.g. a camera image, and with knowledge of the actual geometry of the marker, wherein quite frequently the properties of the respective surroundings sensor must also be known to be able to determine a distance. These image processing algorithms have to process an extremely large amount of data in order to at least partially detect and identify the markers, which can be rather small in the sensor data, particularly if a robust operation has to be ensured. This results in a calculation effort that entails high costs and is generally rather undesirable. Another problem of using dedicated optical markers is that these markers first have to be manufactured/installed.

It should be noted here that, when talking about a "position" of the mobile unit in this description, this typically includes an orientation of the mobile unit in addition to an indication of its place, since this is frequently needed, particularly for navigation applications.

While a relative position applies only in relation to the optical marker, an absolute position for the navigation environment makes it possible to simply locate the mobile unit on a map of the navigation environment in a system of coordinates that at least applies to said environment and to relate it to other features of the navigation environment.

WO 2009/098319 A2 relates to a navigation device for a motor vehicle. It uses position markers at fixed positions along a highway, wherein images from a camera that record a scene in front of the motor vehicle are evaluated to identify position markers, whereafter an absolute position of the position marker is determined using information assigned to said marker, and furthermore a distance between the motor vehicle and the position marker is determined by image processing and an estimation of the position of the motor vehicle is determined from said absolute position and said distance. The markers themselves may contain information about their position or information from which their position can be determined, wherein said position information of the position markers can be retrieved from a memory.

DE 10 2009 045 326 A1 relates to a method and system for designing a database for determining the position of a vehicle using natural landmarks. The object is to record images of the surroundings of the vehicle in a preset route section before reaching a danger point, to determine at least two natural landmarks from the images of the surroundings, to detect reaching of the danger point, and, upon reaching the danger point, to store at least two of the determined landmarks as well as the respective associated vehicle position at the time when the respective image of the surroundings was recorded. The idea is to determine the position relative to a danger point using landmarks if position determination using a conventional positioning system is not sufficient. It is conceivable that video sensing and/or the calculation unit are only activated within the route section before reaching a danger point, wherein then images of the surroundings are recorded and landmarks are determined and stored, where required.

DE 41 38 270 A1 relates to a method for navigating a self-propelled land vehicle, wherein markers are detected as the vehicle travels, digitized and compared with stored data to determine deviations from desired values which are processed into navigation interference signals, wherein said stored data are generated during a learning journey. The idea is to use natural landmarks located in the area. A video camera that can be pivoted about an axis vertical to and about an axis horizontal to the plane of travel, which video camera is to record the landmarks, such that it is eventually possible to calculate the current position of the vehicle relative to a desired point and the current direction of the vehicle with respect to a desired direction. Stored landmarks are used to aim the camera at various landmarks one after the other. The travel time associated with the route must be long enough for this, however.

DE 10 2011 112 404 A1 relates to a method for determining the position of a motor vehicle, which also uses markers, in this case objects, and substantially discloses a procedure in accordance with the introductory part of claim 1. The position determined using the satellite positioning system can also be used to identify the object.

DE 101 21 260 A1 relates to a navigation system as expansion for satellite navigation devices in "indoor range", wherein a parking spot of the motor vehicle can for example stored on a "car finder key".

BRIEF DESCRIPTION OF THE DRAWINGS/FIGURES

DETAILED DESCRIPTION

Figure 1:
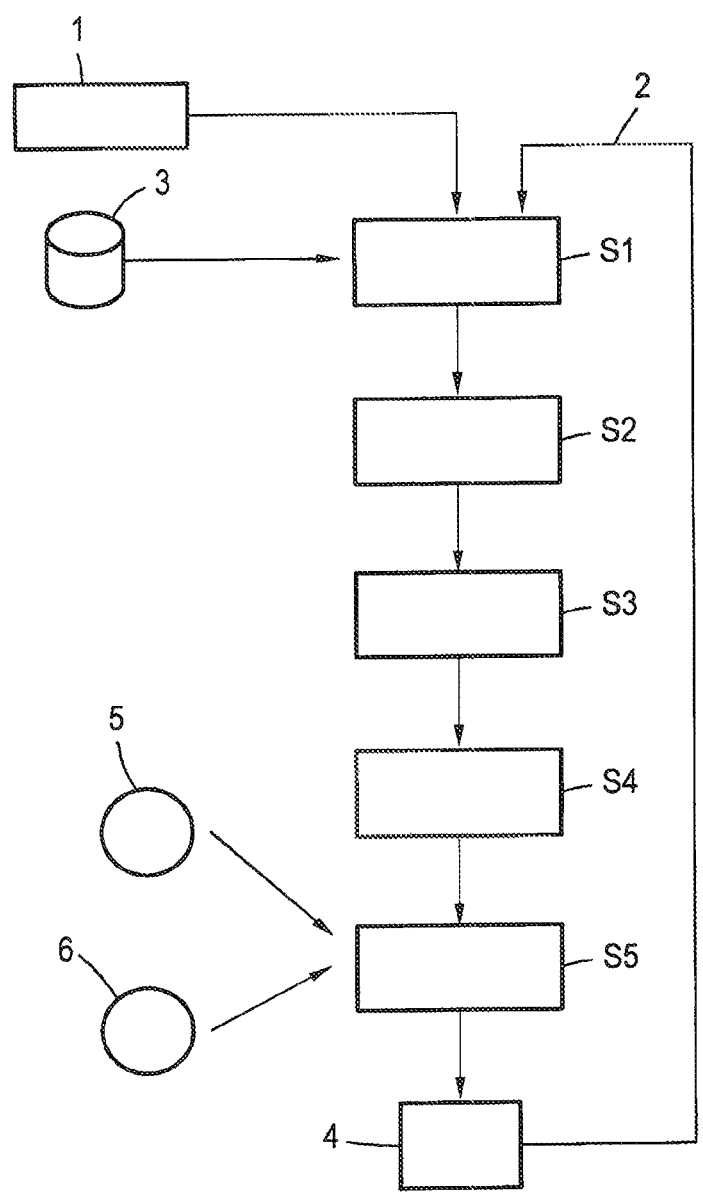
FIG. 1 shows a flow diagram of a method in accordance with an embodiment of the present disclosure.

It is the object of this invention to provide more robust and reliable identification of optical markers of various types in a positioning system.

Since the map dataset contains both a description of the marker which allows its identification and an absolute position of the marker, it is possible to locate and identify markers in sensor data of the optical surroundings sensors, for example a camera, such that, in addition to the relative position of the mobile unit to the marker, the absolute position of the mobile unit in the navigation environment can be determined in accordance with a coordinate system of the map dataset by using the absolute position of the marker. After an absolute position of the mobile unit is also known within the map dataset, the detection areas of the surroundings sensors, mostly multiple cameras, can be determined in the same way as the optical markers that can be detected by the detection areas of the surroundings sensors. This means that it is at least roughly known a priori where optical markers can be found in the sensor data at the current moment. This information is used within the present invention to preselect sensor data available at the current point in time, which reduces the required computing power and increases robustness, since incorrect detections can be reduced. In this way, a current position of the mobile unit can be determined in a highly precise and reliable manner based on the last position detected.

According to the invention, only an extract of an image contained in the sensor data is evaluated in which a marker is expected. In addition, the evaluation can be limited to sensor data of surroundings sensors in whose detection area a marker is located. A first rough selection of sensor data that can be performed using the method according to the invention will thus select the surroundings sensors in whose detection area a marker is expected. Surroundings sensors whose detection area most probably will not include a marker do not have to be evaluated any further by image processing algorithms. This already allows a substantial reduction in computing effort. If however the current position is determined at regular intervals, which can be assumed, it can be estimated much more accurately which sensor data can indeed contain information about a marker, such that in image extracts in which the marker is most likely located can be defined in a refinement process for individual surroundings sensors. This preselection ensures extremely reliable detection and identification of markers in the remaining sensor data that indeed have to be evaluated.

In a particularly advantageous embodiment of the present invention, the markers that can be classified by at least one property and their class are stored in the map dataset, wherein at least one image processing algorithm and/or a parameterization of the image processing algorithm used for evaluating the sensor data is selected as a function of the class of the marker to be detected and identified in the sensor data. This embodiment allows a more targeted detection and identification of optical markers in that the image processing algorithm is selected and/or parameterized with respect to their presumable properties, particularly by adjusting threshold values and/or by setting new filter parameters. For example, it is easy to distinguish between colored and non-colored markers, special marker shapes and the like in that these markers are assigned to different classes which have a concrete impact on the selection and parameterization of the image processing algorithms and thus provide a useful extension of the map dataset. The markers can in detail be classified, for example, based on their geometrical shape and/or whether they are single- or multi-colored and/or whether they have two or three dimensions and/or based on their internal structuring.

In addition, it is particularly useful if the map dataset contains information on potential visual obstacles which are taken into account when determining the adjustment data. The map dataset ideally also contains a complete map of the navigation environment, which may contain walls and other visual obstacles, for determining whether there is a line of sight from the last determined position of the mobile unit relative to the marker (or an estimated current position of the mobile unit derived therefrom, which can then be considered the last position determined) to the marker, more precisely, in the detection area of a surroundings sensor, or whether a visual obstacle is in the way. In this way, only markers that can really be seen are taken into account for determining the adjustment data. Temporary visual obstacles, such as parked motor vehicles and the like if a parking structure is the navigation environment, can of course also be entered in a map dataset containing such visual obstacles.

In an advantageous development of the invention, a position hypothesis derived from the evaluation of the sensor data with respect to the marker can be merged with at least one other position hypothesis for determining the current position. In this embodiment, a first position hypothesis of the mobile unit is established from the absolute position of the marker and the relative position of the mobile unit to the marker and is then entered in a merger of multiple hypotheses generally known from prior art, yielding a current position of the mobile unit. In this respect, the method according to the invention provides an improved additional position hypothesis to be taken into account as part of a merger.

A further position hypothesis can be determined from odometry data and/or acceleration sensor data of at least one acceleration sensor of the mobile unit and/or a further position hypothesis can be determined from hypothesis data obtained using sensors of the navigation environment, and/or a further position hypothesis can be determined based on the reception strength of at least one wireless local area network (WLAN) signal at the current position of the mobile unit. In addition to the possibilities just mentioned for deriving other position hypotheses, other ways of determining position hypotheses may of course be taken into account if these can at least partially be used in the navigation environment. An example of such other position determination options is positioning using a global navigation satellite system (GNSS), particularly a GPS, which can at least be partially available indoors.

The basis used most frequently in known prior art as part of a merger of position hypotheses into an eventually determined current position is a determination of the current movement of the mobile unit, particularly via odometry data which are available anyway if a motor vehicle is the mobile unit, or by reading out acceleration sensors, for example an inertial platform (inertial measurement unit; IMU) which are quite typically also installed in mobile devices and allow assumptions on the movement of the mobile device. Now that parking structures have become known as navigation environments which either include WLAN base stations or in which such base stations are retrofitted, it is expedient to utilize the reception strengths of various WLAN base stations for determining another position hypothesis. For example, a "fingerprint", which is preferably contained in the map dataset, can be stored for the different field strengths of the WLAN base stations representing different absolute positions in the navigation environment. The positioning system then compares the current reception strengths of the WLAN base stations with the reference datasets stored as the fingerprint and can in this way establish a WLAN position hypothesis, which can usefully be included in the merger. Another data source frequently mentioned in conjunction with determining the position of a mobile unit are the sensors of the navigation environment itself, such as laser scanners or cameras, which detect the mobile unit and thus can themselves provide position hypothesis data which can then be transmitted, via a radio connection or even the WLAN connection mentioned above, to the mobile unit and used there. Another possibility to be mentioned is the evaluation of the sensor data of other surroundings sensors of the mobile unit. For example, surroundings sensors measuring over distances to detect walls and/or other obstacles stored in the map dataset can be used to estimate a position based on these measurements and derive a position hypothesis. The marker position hypothesis and the other hypotheses, such as the WLAN position hypothesis, the odometry position hypothesis, and/or the navigation environment sensing hypothesis can then be merged in a known manner to obtain a current position of the mobile unit that is as accurate as possible.

As mentioned above, it is particularly useful for a WLAN position hypothesis if a map dataset is used that includes WLAN reception strengths assigned to positions in the navigation environment, because this facilitates a comparison of the current WLAN reception strengths in the mobile unit with these "fingerprints".

An initial position of the mobile unit is determined at the beginning of a navigation in the navigation environment. In a useful embodiment of the present invention, an initial position is determined in the area of an entrance to the navigation environment, particularly by detecting and identifying at least one access marker in the sensor data of the surroundings sensors. Parking structures as navigation environments often include an area with barriers in which an initial position determination can be forced. A barrier itself can represent such an access marker, but such markers can also be placed elsewhere in the access area of the navigation environment where they can easily be recognized to allow as exact a positioning as possible.

In another embodiment of the method according to the invention, a position hypothesis determined taking into account odometry data and/or acceleration sensor data of at least one acceleration sensor of the mobile unit is used as the last determined position for determining the adjustment data, starting from the position of the mobile unit determined previously using an evaluation of the sensor data with respect to the markers. In this way, the mobile unit's odometry information that is always carried along and known anyway is used to further refine the determination of the adjustment data in that the movements of the mobile unit inferred from the always available additional information are taken into account in a first rough estimation of the current position of the mobile unit. This further increases the reliability of the method according to the invention and makes it possible to further reduce the computing effort by more accurately limiting the potential sensor data.

In this context, it is also very useful to consider a quality and/or error specification of the last determined position when determining the degree of limitation of the sensor data of the surroundings sensors to be evaluated for the detection and identification of the at least one marker. If, for example, a merger of position hypotheses is performed, a value is often obtained indicating the reliability of the current position as determined, that is, describing its quality and/or affliction with faults. If it is known that the last determined position is rather more inaccurate, it is recommended to make more sensor data accessible to the evaluation with respect to the detection and identification of the markers, and if the last determined position is considered to be more accurate, the portion of sensor data to be evaluated can be further limited.

It is particularly advantageous to store the map dataset in the mobile unit. Then the complete evaluation and positioning can be performed in the positioning system without requiring constant or frequent data exchange, for example, with a server of the navigation environment. This is also a clear reduction in effort. It can be particularly expedient to keep the size of the map dataset rather compact, that is, to include a small volume of data as the map dataset.

In a particularly preferred embodiment of the present invention, the map dataset is determined from the sensor data of the at least one surroundings sensor after recording an image of an information carrier which optically encrypts the map data. A static information carrier is used in this case which is preferably disposed in the access area of the navigation environment and recorded in any case by the surroundings sensors of the mobile unit to implement unidirectional communication, which is completely sufficient for this purpose. The optical information carrier contains the map data of the map dataset in a suitably encrypted form such that the data can be extracted after as simple an evaluation as possible. The information carrier can for example be provided underneath the house rules or the like, which are often posted anyway in the access area if a parking structure is the navigation environment.

The information carrier can particularly be a two-dimensional bar code, for example a so-called quick response (QR) tag. The latter example of a two-dimensional bar code is based on the QR code and is frequently used in logistics or advertising. Such two-dimensional bar codes can accommodate up to three kilobytes of data, which is sufficient for coding the optical markers and their absolute positions. If for example AR tags are used as unique optical markers, which can easily be installed in navigation environments, such as parking structures, their identification numbers and absolute positions can be coded easily in a two-dimensional bar code. Assuming the absolute positions are specified as WGS84 positions with height specification, this will require 24 bits. Up to 128 AR tags can be distinguished using 7 bits. The assignment of the AR tag identifiers to the patterns can be defined in a standard. This would allow coding up to 99 positions in two-dimensional bar codes that can hold 3 kilobytes of data.

The particular advantage of using such an optical information carrier, particularly a two-dimensional bar code, is that no other complex technology outside the mobile unit must be used, particularly no radio technologies such as WLAN technologies. Nevertheless it is alternatively possible, of course, to transmit the map dataset to the motor vehicle via a radio connection, particularly a WLAN connection.

In a useful further development of the method, a triangulation based on the relative position of the markers to the mobile unit is performed when detecting and identifying at least two markers in a single positioning process. It can considerably increase the positioning accuracy after two known relative positions allow a triangulation. A triangulation is also useful if the relative position to the marker is not fully determined but is only known as a distance or the like, for example. If multiple potential absolute positions of the mobile unit occur in a triangulation, an absolute position can be selected based on odometry data and/or acceleration sensor data of at least one acceleration sensor of the mobile unit. The position history thus makes it possible to discard implausible triangulations, which again increases the robustness in this respect.

It is preferred that a motor vehicle and/or a mobile device are used as mobile unit. Particularly, both a motor vehicle and a mobile device can be expediently used during a single navigation process, since a particularly preferred embodiment of the invention envisages that, when a motor vehicle as a mobile unit is parked in a navigation environment, at least the determined parking position of the motor vehicle is transmitted to a mobile device that is connected to the motor vehicle and used as another mobile unit, and is used there for navigation to the parked motor vehicle within the navigation environment.

This is based on the realization that not only motor vehicles can expediently be used as mobile units within the present invention because they already include the required surroundings sensors and do not require any special equipment. It is also typical that odometry data are determined in motor vehicles, which are useful in many embodiments as mentioned above. But in addition to a motor vehicle, mobile devices such as smartphones or tablets also frequently meet the basic requirements for the method according to the invention, since their cameras comprise the required surroundings sensors and they are typically equipped with acceleration sensors via which their movement can be tracked to determine odometry data. If, for example, a motor vehicle as the mobile unit has been guided to a free parking spot, the extremely advantageous option arises to transmit the final parking position of the motor vehicle to the mobile device, for example a smartphone, since a positioning system of the type according to the invention can be implemented there as well. The mobile device can detect the optical markers using the camera and create a marker position hypothesis just as well as an odometry position hypothesis or a WLAN position hypothesis, since mobile devices are often WLAN-capable. Increased robustness and accuracy can be achieved by merging various position hypotheses, and the mobile device can be used to guide the driver back to his or her vehicle, that is, to its final parking position, within a navigation environment such as a parking structure. The mobile device can of course be used to perform other navigation tasks as a mobile device, such as navigation to an exit of the parking structure, a ticket machine and the like.

As mentioned above, it is highly expedient in the context of using a motor vehicle or a mobile device that the navigation environment is a parking structure. Navigation via GPS or GNSS is not available or only available to a limited extent in many parking structures, and the method according to the invention remedies that and allows navigation without such navigation options intended for use in outdoor terrains. Thus the navigation of a motor vehicle within a parking structure represents a very special exemplary embodiment of the present invention, and it is particularly useful where the parking structure does not have any active sensing means (laser scanners, cameras, GPS repeaters, radio beacons) and an optical information carrier can be read by the surroundings sensors of the motor vehicle. Navigation inside a building from the entrance to a free parking spot and vice versa is made available; the positioning system can be initialized in areas where GPS is inactive. The motor vehicle also does not require any retrofitting of sensing equipment since many modern motor vehicles already include such means, particularly surroundings sensors.

As mentioned above, AR tags, which are substantially known from prior art, are particularly suitable as markers. A specific marker type is then given that can easily be detected and distinguishably retrofitted, particularly in parking structures and the like. Other markers are conceivable as well, of course; these should preferably be similarly well detectable and sufficiently distinguishable to allow detection.

A particularly advantageous embodiment of the present invention, which by the way can be implemented advantageously regardless of limitations of the sensor data for evaluation, can do without installing special markers for positioning since it uses an environmental feature of the navigation environment which at least originally was serving another purpose as a marker. In this embodiment, existing features that originally were not used for positioning but for another purpose, are put to an additional use, that is, as markers for positioning. Such 'natural' features make navigation through the navigation environment possible even without installing dedicated optical markers. Thus no additional markers that may be perceived as unusual by humans are required.

This embodiment is particularly advantageous in combination with a selection and/or parameterization of the image processing algorithms depending on a class of markers. There is a certain variability of the markers, particularly when existing features of the navigation environment are used, such that different parameters and/or different image processing algorithms are needed to ensure reliable detection and identification of the markers. In this context, it is expedient to classify these 'natural' features of the navigation environment and to inform the positioning system of their class by means of the map dataset such that it can perform a respective selection and/or parameterization of the image processing algorithms. For example, the sensor threshold values and/or sensor filtering techniques can be adjusted and/or activated and/or deactivated.

If the navigation environment is a parking structure, lane markings and/or parking spot numbers and/or emergency exit signs and/or fire extinguisher signs and/or advertising posters can be used. Parking structures particularly comprise partially standardized markings which originally serve other purposes and whose position is partially predetermined by standards and/or indicated on building maps. Examples of such natural markers include parking spot numbers, lane markings, colored parking deck levels, billboards, emergency exit lights, traffic signs, fire extinguisher signs and the like. Preferably such 'natural' markers that are discussed can be features that are provided by standards for parking spaces. Information signs and/or lights, particularly the emergency exit and fire extinguisher signs mentioned above, are particularly suited for determining a relative position. These can be detected particularly easily by respective algorithms after their class is known, as described above, and this is often also true of lane markings and/or parking spot numbers, which are intentionally designed and placed to be well readable. Apparently, a multitude of options is conceivable for selecting useful classes of such features which were originally provided for other purposes.

In addition to the method, the present invention also relates to a mobile unit including at least one optical surroundings sensor which captures a detection area of the environment of the mobile unit and a positioning system with a control unit configured to perform the method according to the invention. All that has been said about the method according to the invention can likewise be applied to the mobile unit according to the invention.

The mobile unit preferably is a motor vehicle or a mobile device, for example a smartphone, which are used for navigation within a navigation environment, particularly a parking structure. The positioning system can therefore, generally speaking, also be part of a navigation system that can navigate the mobile unit or the operator of the mobile unit to a specific destination, in the example of a parking structure to a parking spot, an exit ramp, an exit, a ticket machine, back to one's own motor vehicle and the like.

Other advantages and details of the present invention can be derived from the following description of exemplary embodiments and from the drawing.

A method according to the invention for operation of a positioning system which can be part of a navigation system will initially be explained with reference to FIG. 1, which shows a flow diagram. Specific exemplary embodiments will then be discussed with reference to FIGS. 2 to 8.

The method shown in FIG. 1 is aimed at localizing a mobile unit in a navigation environment and is particularly robust and efficient to perform. The method for operating a positioning system utilizes the last determined position of the mobile unit in the navigation environment, which at the start of the method is an initial position 1; in subsequent position determinations, the last position determined using the method is used, see arrow 2, both as the basis for a rough estimation of the current absolute position using odometry data that describe the movement of the mobile unit.

The method uses optical markers as the basis for determining a position hypothesis, and said optical markers can be captured using surroundings sensors of the mobile unit and detected and identified by image processing algorithms in a control unit of the positioning system. Detecting such optical markers can be extremely complex and require a great effort. In order to decrease the effort required and to considerably reduce incorrect detections, the method includes a step S1 in which adjustment data are determined which describe the markers that can be captured by the surroundings sensors and their position relative to the mobile unit, taking into account the last determined position of the mobile unit.

This is possible because the basis of the method described is that, after the detection and identification of the markers, a position of the markers relative to the mobile unit is known, and said relative position can be used to determine an absolute position of the mobile unit using the data contained in a map dataset 3 about the position of the identified marker. Conversely, this means that the type of optical markers located in the detection area of the surroundings sensors can be derived from a known or estimated absolute position of the mobile unit if the properties of said sensors, particularly their detection areas, are also known; this information is typically stored in the mobile unit itself and needed anyhow for determining the relative position.

In the general exemplary embodiment shown here, the first pending localization starts at an initial position 1, otherwise it starts from the last position 4 determined using the optical markers, and proceeds to perform a rough estimation of the current position of the mobile unit based on information that describes the movement of the mobile unit, particularly odometry data and/or data of acceleration sensors of the mobile unit, relative to which current position the surroundings sensors determine visible markers, particularly their position in the detection area. The map dataset 3 can expediently contain information about visual obstacles, such as walls, for this purpose.

If optical markers of such different types are used that different image processing algorithms or at least different parameterizations of the image processing algorithms used are required, a class is assigned to the description of the markers and their absolute position in the map dataset 3, since the markers can be assigned to different classes. Such information then also forms part of the adjustment data.

In a step S2, the adjustment data are used to make a preselection of sensor data of the optical surroundings sensors of the mobile unit. This preselection determines the surroundings sensor whose sensor data are to be evaluated for the presence of markers and which portions of the images recorded by the respective surroundings sensor are relevant. This means that, for all detectable markers, an image extract is determined in which a specific marker is assumed to be detectable. If the class of the marker to be detected in the image extract is also known, which is particularly expedient if features are used as markers which originally served another purpose, the image processing algorithms are also selected and/or parameterized in step S2, for example with respect to threshold values and/or filtering techniques. This ensures reliable detection and identification of markers requiring less computing effort in the subsequent steps, since the sensor data to be evaluated can be considerably limited and fitting or fittingly parameterized image processing algorithms can be used.

It should be noted here that the map dataset 3 is expediently stored in the mobile unit itself, such that all information required for performing the method is available in the mobile unit itself. The map dataset can be stored in the mobile unit, for example, in the process of determining the initial position 1 by optically reading the map dataset, particularly at an entrance of the navigation environment or by transmitting it to the mobile unit in another way, which will be discussed in detail below.

It should further be noted that when limiting the sensor data to be evaluated in steps S1 and S2 reliability data can be taken into account indicating the reliability of the last determined position of the mobile unit, particularly a quality and/or fault value, such that the limitation can be set wider or narrower depending on the accuracy of the last determined position of the motor vehicle.

In a step S3, the markers are detected and identified in the limited volume of sensor data, if required by using selected and/or parameterized image processing algorithms. The result of step S3 therefore is at least a relative position of the mobile unit relative to a marker; multiple relative positions can of course be determined if multiple markers can be detected.

In a step S4, a position hypothesis is established for determining the absolute position of the mobile unit based on the optical markers. Starting from the absolute position of the marker known from the map dataset 3, an absolute position hypothesis of the mobile unit is determined using the positions of the marker and the mobile unit relative to one another. A particular situation occurs if two or more markers were detected and identified, since the position can be determined more accurately using triangulation. If triangulation results in multiple potential positions, outlying position hypotheses can be excluded by considering the position history and/or movement of the mobile unit (odometry data, acceleration sensors).

In a step S5, the marker position hypothesis determined in step S4 is merged in a known manner with other position hypotheses 5, 6 to obtain the best possible value for the current position 4 of the mobile unit. In the present exemplary embodiment, the other position hypothesis 5 is derived from odometry data or from acceleration sensor data describing the movement of the mobile unit while the position hypothesis 6 was determined based on the reception strengths of various WLAN base stations. For this purpose, "fingerprints" of reception field strengths are stored in the map dataset and assigned to various potential positions, such that a position hypothesis can be established by comparing the actual reception field strengths with the stored reception field strengths. Of course, exemplary embodiments are conceivable where less, more and/or other position hypotheses are included in the merger in step S5, for example position hypotheses based on global navigation satellite systems and the like.

Figure 2:
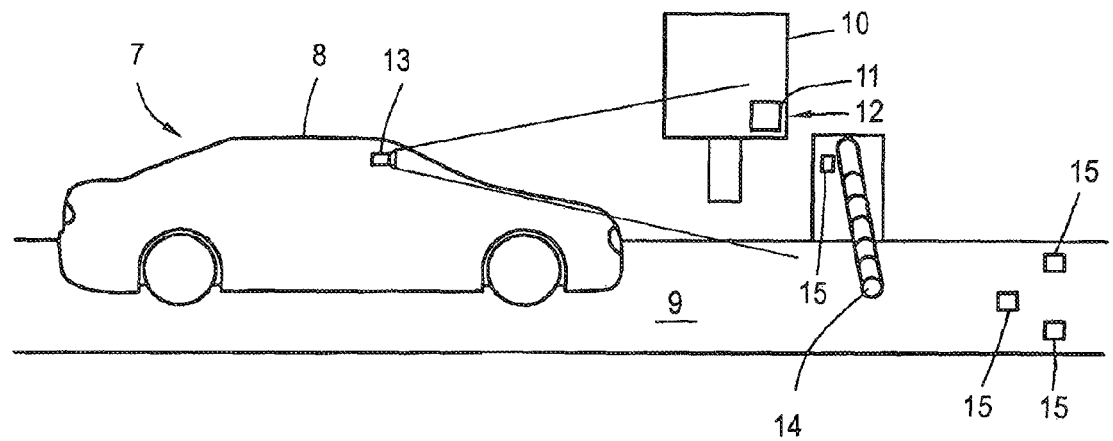
FIG. 2 shows a motor vehicle as a mobile unit in an entrance area of a parking structure in accordance with an embodiment of the present disclosure.

Some specific exemplary embodiments will be discussed below with reference to FIGS. 2 to 8. FIG. 2 shows a motor vehicle 8 used as the mobile unit 7 in the access area 9, in this case an entrance area, of a parking structure as the navigation environment. A board 10 shows the house rules and was supplemented with a two-dimensional bar code 11, here a QR tag, as optical information carrier 12. The map dataset 3 is optically encoded in the two-dimensional bar code 11, such that it can be captured using the optical surroundings sensor 13 of the motor vehicle 8 and subsequent image processing and stored in the motor vehicle 8. This is a simple way to transfer the map dataset 3 to the mobile unit 7 that requires no radio transmission or the like.

An initial position 1 can also be determined in the access area 9 using the surroundings sensors 13, since not only is a barrier 14 provided there anyway that can be used as an optical marker and is often designed in quite a striking manner, but there are also additional optical markers 15, in this case a special arrangement of QR tags which allows very precise position determination. The markers 15 can thus be considered access markers. They can of course be used as optical markers in the further course of the method.

Figure 3:
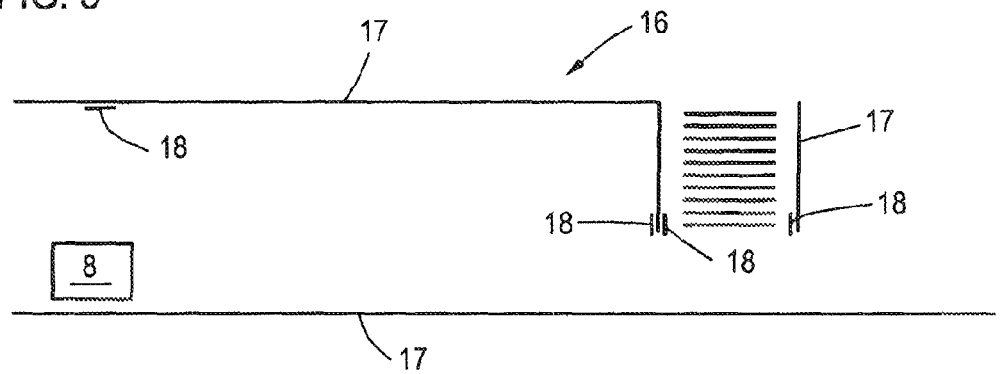
FIG. 3 shows a motor vehicle as a mobile unit in a parking structure with markers in accordance with an embodiment of the present disclosure.

FIG. 3 shows the motor vehicle 8 in another area of the navigation environment 16 which is configured as a parking structure. Additional optical markers 18 designed as AR tags were attached to various walls 17; their absolute positions are stored in the map dataset 3 and they can be detected by the surroundings sensors 13 of the motor vehicle 8 as long as there is a line of sight and they are located in the detection area.

Figure 4:
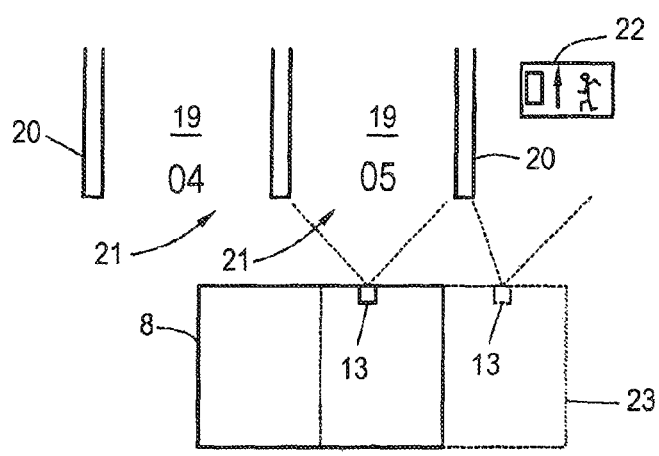
FIG. 4 shows a schematic sketch for using markers which originally serve another purpose in accordance with an embodiment of the present disclosure.

Additionally or alternatively, exemplary embodiments are conceivable in which environmental features of the navigation environment 16 that originally serve another (different) purpose are used as markers, as shown in FIG. 4. The motor vehicle 8 can be seen there in the area of parking spots 19. The parking spots 19 are separated by lane markings 20 and have parking spot numbers 21. An emergency exit sign 22 is visible above an emergency exit not shown in detail. The lane markings 20, the parking spot numbers 21, and the emergency exit sign 22 can be considered environmental features which originally serve another purpose and can in addition be used as optical markers. Due to their nature as means of information provided in a standardized manner, they can easily be spotted, also as part of an image processing procedure. This applies particularly if these environmental features used as markers are assigned a class in the map dataset 3, such that a targeted search for emergency exit signs 22 can be performed in the sensor data, for example. In this example, lane markings 20 and a parking spot number 21 at the solid position of the motor vehicle 8 are in the dashed detection area of a lateral surroundings sensor 13.

Until an absolute position can be determined the next time, the motor vehicle 8 can for example move to the position 23 shown in dashed lines that can be roughly estimated based on the odometry data, in which position the surroundings sensor 13 will apparently record the emergency exit sign 22 in an upper central image extract. This is determined based on the adjustment data in steps S1, S2 and used for limiting the sensor data and for selecting and/or parameterizing the image processing algorithms.

Other "natural" markers that originally serve another purpose are conceivable, of course, for example fire extinguisher signs, parking deck identifying color markings, advertising posters, and the like.

Figure 5:
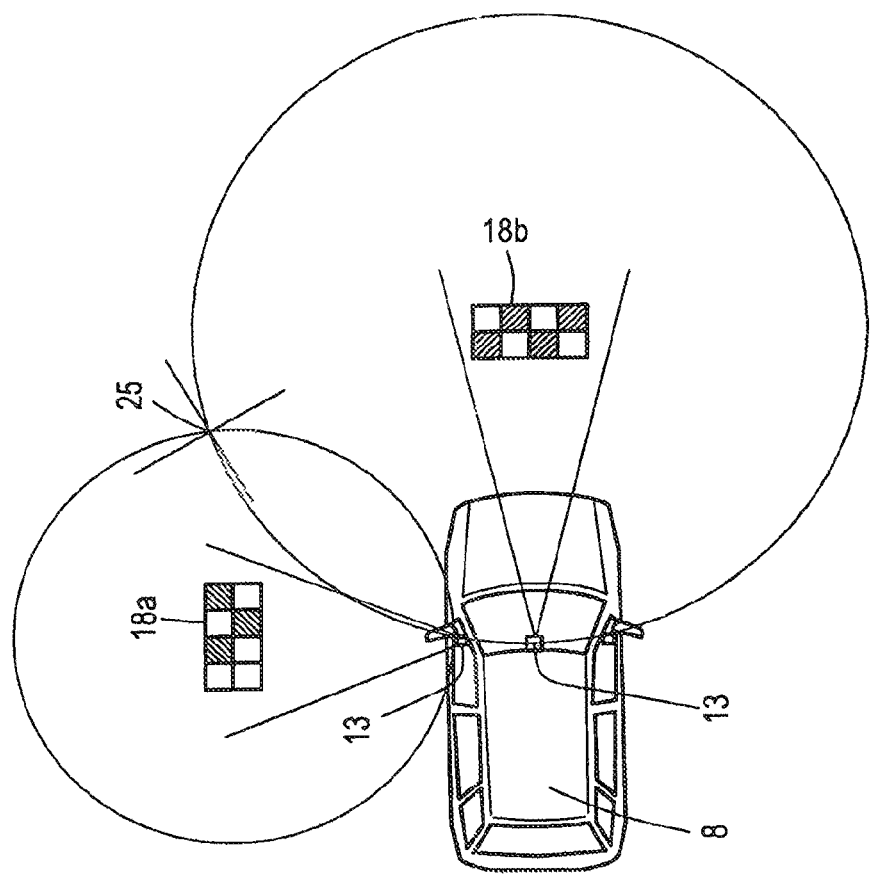
FIG. 5 shows a schematic sketch on triangulation in accordance with an embodiment of the present disclosure.
Figure 5:
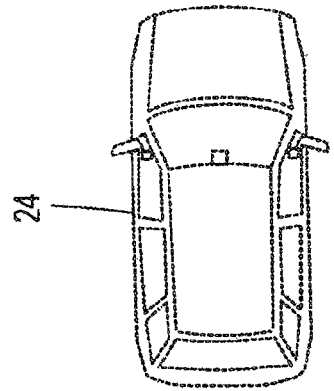

FIG. 5 shows potential positioning improvements by triangulation in the form of a rough schematic sketch. The two markers 18a, 18b configured as AR tags are apparently captured by one surroundings sensor 13 of the motor vehicle 8, respectively. Thus two relative positions of the motor vehicle 8 to two absolute positions of the markers 18a, 18b are known, enabling more accurate positioning. Should a case occur in which several potential absolute positions of the motor vehicle 8 can be determined as position hypotheses, obviously invalid potential positions 25 can be excluded by considering the position history indicated by the previous position 24 and/or odometry data of the motor vehicle 8.

Figure 6:
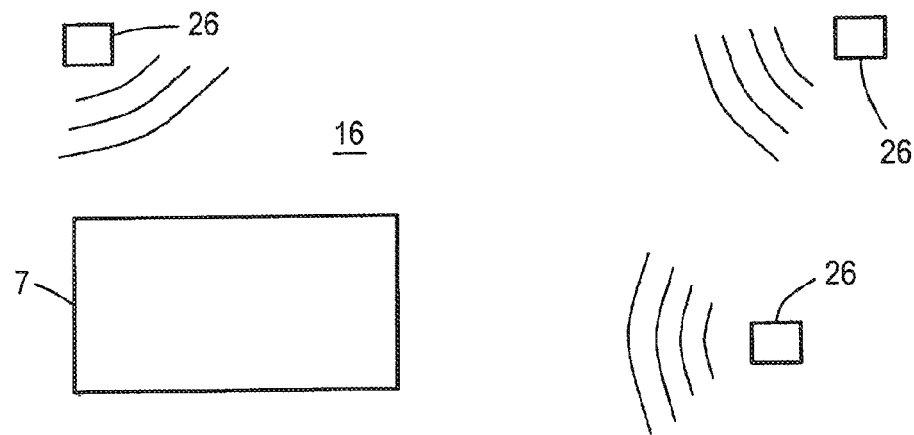
FIG. 6 shows a drawing for determining a position hypothesis based on reception strengths in accordance with an embodiment of the present disclosure.

FIG. 6 shows a general sketch of a mobile unit 7 in the navigation environment 16 in which WLAN base stations 26 are disposed at various locations. When looking at the reception field strengths of the various base stations 26 as a dataset, a kind of "fingerprint" can be derived that allows at least a rough estimation of the position in the navigation environment 16, since such "fingerprints" can be stored in the map dataset 3 for various positions in the navigation environment 16.

The positioning method shown, which provides a current absolute position 4 of the mobile unit 7 in the navigation environment 16 as a result, which of course includes an orientation of the mobile unit 7, can expediently be used for navigation purposes within the navigation environment 16.

Figure 7:
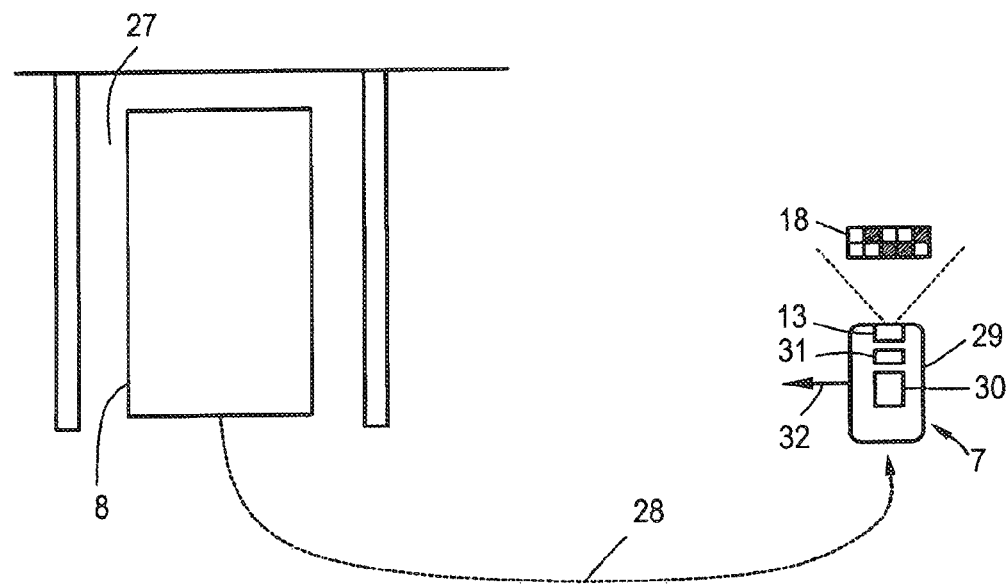
FIG. 7 shows a use of a mobile device as a mobile unit in accordance with an embodiment of the present disclosure.

In parking structures as navigation environment 16, this is useful both for motor vehicles 8 as mobile units 7, which can be guided to a free parking spot/to the exit, and for mobile devices as mobile units 7, since these can guide a driver back to the motor vehicle 8 (or to other destinations within the navigation environment 16). FIG. 7 explains this in detail. The motor vehicle 8 is parked in a parking spot 27. The last determined current position of the motor vehicle 8 as mobile unit 7 corresponds to the parked position. After the motor vehicle 8 is parked in the parking spot 27, said position is transmitted to the mobile device 29 as another mobile unit 7 as indicated by the arrow 28. It is useful in this context that the map dataset 3 is transmitted as well. The mobile device 29, which may for example be a smartphone, is suitable as a mobile unit 7 since it can also detect markers 18 using the integral camera as surroundings sensor 13. In addition, the mobile device 29 includes acceleration sensing means 30 from which movements of the mobile device 29 can be inferred, as well as in some embodiments a WLAN receiving unit 31 with which fingerprints for WLAN base stations 26 can be created.

It is for example possible to navigate a driver back to his or her parked motor vehicle 8, as indicated by the arrow 32, by implementing a positioning system on the mobile device 29.

Figure 8:
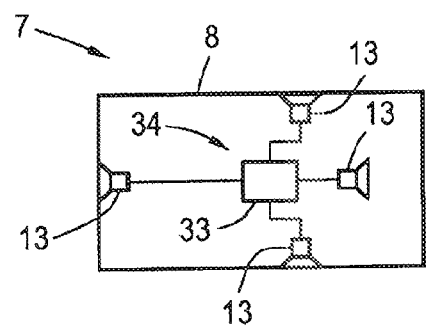
FIG. 8 shows a mobile unit which is configured as a motor vehicle in accordance with an embodiment of the present disclosure.

FIG. 8 finally shows another schematic sketch of a mobile unit 7 configured as a motor vehicle 8. The motor vehicle 8 includes four cameras aimed in directions perpendicular to one another as surroundings sensors 13, one of which being aimed forward, one rearward, and two aimed at one side each and all capable of capturing the surroundings of the motor vehicle 8. The sensor data of the surroundings sensors 13 are transmitted via a bus system, for example a CAN bus or a Flex Ray bus, to a control unit 33 of a positioning system 34, wherein the control unit 33 is configured for performing the method according to the invention. This means that it can suitably limit the sensor data to be evaluated based on knowledge about the last determined position of the motor vehicle 8 and the map dataset 3 and adjust the image processing algorithms to the class of marker, if required.

The positioning method 34 can be part of a navigation system. The control unit 33 is of course also connected to other vehicle systems not shown here, which can for example provide data for other position hypotheses and the like, for example an inertial platform and other sensors for capturing odometry data, a communication device for WLAN communication, a GPS sensor and the like.

The invention claimed is:

1. A method for determining an absolute position of a mobile unit, which has at least one optical surroundings sensor that captures a detection area of an environment of the mobile unit, in a predefined navigation environment, the method comprising:
   determining, based on a last determined position of the mobile unit and a map dataset, adjustment data that indicates a plurality of optically, distinguishable markers that are able to be detected at a current point in time by the at least one optical surroundings sensor and positions of the plurality of optically, distinguishable markers relative to the mobile unit, wherein each of the plurality of optically, distinguishable markers is used in the predefined navigation environment and is assigned an absolute position that is retrievable from the map dataset;
   detecting and identifying, by means of an image processing algorithm, one of the plurality of optically, distinguishable markers in sensor data recorded by the at least one optical surroundings sensor for position determination, wherein the adjustment data is used to limit the sensor data to be evaluated in order to detect and identify the one of the plurality of optically, distinguishable markers;
   determining a relative position between the mobile unit and the one of the plurality of optically, distinguishable markers based on a position of the one of the plurality of optically, distinguishable markers in the sensor data; and
   determining the absolute position of the mobile unit as a function of the relative position between the mobile unit and the one of the plurality of optically, distinguishable markers and an absolute position of the one of the plurality of optically, distinguishable markers,
   wherein only one extract of an image contained in the sensor data in which the one of the plurality of optically, distinguishable markers marker is expected is evaluated,
   wherein the adjustment data is further determined based on potential visual objects contained in the map dataset.

2. The method according to claim 1, wherein, based on the adjustment data, the sensor data to be evaluated is limited to sensor data of optical surroundings sensors that have a detection area in which the one of the plurality of optically, distinguishable markers is able to be detected at the current point in time.

3. The method according to claim 1, further comprising:
   evaluating the sensor data as a function of a class of the one of the plurality of optically, distinguishable markers.

4. The method according to claim 1, further comprising:
   merging the absolute position of the mobile unit with at least one other position hypothesis for the mobile unit.

5. The method according to claim 4, further comprising:
   determining the at least one other position hypothesis for the mobile unit from odometry data, acceleration sensor data, or reception strength of at least one wireless local area network (WLAN) signal.

6. The method according to claim 5, wherein the map dataset further comprises WLAN reception strengths assigned to positions in the navigation environment.

7. The method according to claim 1, further comprising:
   determining an initial position in an area of an entrance to the navigation environment by detecting and identifying at least one access marker in the sensor data of the at least one optical surroundings sensor.

8. The method according to claim 1, further comprising:
   determining the last determined position of the mobile unit as a position hypothesis determined based on odometry data or acceleration sensor data of at least one acceleration sensor of the mobile unit.

9. The method according to claim 1, wherein a degree in which the adjustment data is used to limit the sensor data to be evaluated in order to detect and identify the one of the plurality of optically, distinguishable markers is determined based on a quality or error specification of the last determined position.

10. The method according to claim 1, wherein the map dataset is stored in the mobile unit.

11. The method according to claim 10, wherein the map dataset is determined from the sensor data of the at least one surroundings sensor after recording an image of an information carrier which optically encrypts the map dataset.

12. The method according to claim 11, wherein a two-dimensional bar code is used as the information carrier.

13. The method according to claim 1, further comprising:
performing a triangulation when at least two of the plurality of optically, distinguishable markers are detected and identified, based on the relative position of the at least two of the plurality of optically, distinguishable markers to the mobile unit.

14. The method according to claim 13, further comprising:
selecting from multiple positions that result from performing the triangulation based on odometry data or acceleration sensor data of at least one acceleration sensor of the mobile unit.

15. The method according to claim 1, wherein the mobile unit is a motor vehicle or a mobile device.

16. The method according to claim 15, further comprising:
transmitting a determined parking position of the mobile unit in the navigation environment to a mobile device that is connected to the mobile unit.

17. The method according to claim 1, wherein the navigation environment is a parking structure.

18. The method according to claim 1, wherein the one of the plurality of optically, distinguishable markers is an environmental feature of the navigation environment.

19. The method according to claim 18, wherein the plurality of optically, distinguishable markers comprise a lane marking, parking spot number, emergency exit sign, fire extinguisher sign, or advertising poster.

* * * * *